United States Patent
Vasseur et al.

(10) Patent No.: US 9,230,104 B2
(45) Date of Patent: Jan. 5, 2016

(54) DISTRIBUTED VOTING MECHANISM FOR ATTACK DETECTION

(71) Applicant: Cisco Technology, Inc., San Jose, CA (US)

(72) Inventors: Jean-Philippe Vasseur, Saint Martin d'Uriage (FR); Andrea Di Pietro, Lausanne (CH); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/273,676

(22) Filed: May 9, 2014

(65) Prior Publication Data

US 2015/0324582 A1 Nov. 12, 2015

(51) Int. Cl.
*H04L 29/06* (2006.01)
*G06F 21/55* (2013.01)

(52) U.S. Cl.
CPC .................................... *G06F 21/554* (2013.01)

(58) Field of Classification Search
CPC ....... G06F 21/00; G06F 21/55; G06F 21/552; G06F 21/554; G06F 21/56; G06F 21/561; G06F 21/562; G06F 21/567
See application file for complete search history.

(56) References Cited

U.S. PATENT DOCUMENTS

| | | | |
|---|---|---|---|
| 7,873,583 B2 | 1/2011 | Laxman et al. | |
| 8,103,727 B2 | 1/2012 | Lin | |
| 8,370,928 B1 | 2/2013 | Motwani et al. | |
| 8,504,504 B2 | 8/2013 | Liu | |
| 2004/0128355 A1* | 7/2004 | Chao et al. | 709/206 |
| 2005/0286772 A1 | 12/2005 | Albertelli | |
| 2007/0277242 A1* | 11/2007 | Baker et al. | 726/25 |
| 2008/0083029 A1 | 4/2008 | Yeh et al. | |
| 2008/0140795 A1 | 6/2008 | He et al. | |
| 2009/0276852 A1* | 11/2009 | Alderson et al. | 726/23 |
| 2009/0287618 A1* | 11/2009 | Weinberger et al. | 706/10 |
| 2010/0317391 A1 | 12/2010 | Mody et al. | |
| 2011/0055920 A1* | 3/2011 | Hariri | 726/22 |

OTHER PUBLICATIONS

Brachmann, Martina, et al. "End-to-end transport security in the IP-Based Internet of Things." Computer Communications and Networks (ICCCN), 2012 21st International Conference on. IEEE, 2012.*
Dietterich, T. G., "Ensemble Methods in Machine Learning", Lecture Notes in Computer Science, vol. 1857, pp. 1-15, Springer Berlin Heidelberg.
Gnawali, et al., "The Minimum Rank with Hysteresis Objective Function", Request for Comments 6719, Sep. 2012, 13 pages, Internet Engineering Task Force Trust.
(Continued)

*Primary Examiner* — Yogesh Paliwal
(74) *Attorney, Agent, or Firm* — Parker Ibrahim & Berg LLC; James M. Behmke; Kenneth J. Heywood

(57) ABSTRACT

In one embodiment, a network node receives a voting request from a neighboring node that indicates a potential network attack. The network node determines a set of feature values to be used as input to a classifier based on the voting request. The network node also determines whether the potential network attack is present by using the set of feature values as input to the classifier. The network node further sends a vote to the neighboring node that indicates whether the potential network attack was determined to be present.

22 Claims, 13 Drawing Sheets

(56) References Cited

OTHER PUBLICATIONS

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low-Power and Lossy Networks", Request for Comments 6551, Mar. 2012, 30 pages, Internet Engineering Task Force Trust.

Winter; et al., "RPL: IPv6 Routing Protocol for Low-Power and Lossy Networks", Internet Engineering Task Force, Request for Comments 6550, Mar. 2012, 157 pages.

International Search Report mailed Aug. 4, 2015 in connection with PCT/US2015/028459.

* cited by examiner

DISTRIBUTED VOTING MECHANISM FOR ATTACK DETECTION

TECHNICAL FIELD

The present disclosure relates generally to computer networks, and, more particularly, to performing attack detection using a distributed voting mechanism.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like also present unique challenges to LLNs.

One type of network attack that is of particular concern in the context of LLNs is a Denial of Service (DoS) attack. Typically, DoS attacks operate by attempting to exhaust the available resources of a service (e.g., bandwidth, memory, etc.), thereby preventing legitimate traffic from using the resource. A DoS attack may also be distributed, to conceal the presence of the attack. For example, a distributed DoS (DDoS) attack may involve multiple attackers sending malicious requests, making it more difficult to distinguish when an attack is underway.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
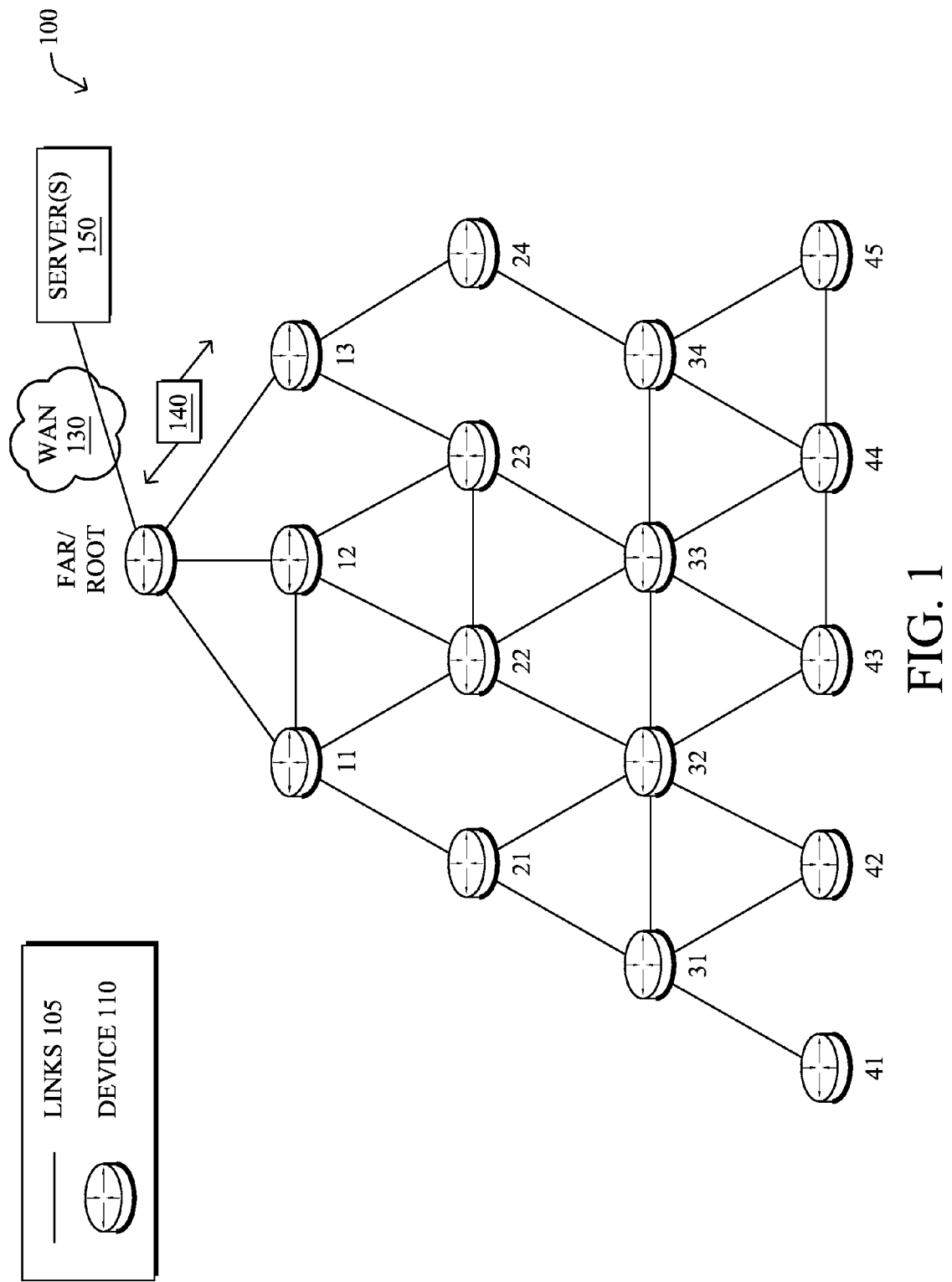
FIG. 1 illustrates an example communication network.

According to one or more embodiments of the disclosure, a first network device detects a potential network attack by executing a classifier. The classifier is configured to select a label from among a plurality of labels based on a set of input features. Voting requests are sent by the first network device to a plurality of neighboring network devices. The voting requests identify the potential network attack. A particular neighboring network device determines input features for a local classifier and uses the local classifier to generate a vote regarding the potential network attack. The first network device receives, from one or more of the neighboring network devices, votes regarding the potential network attack. The first network device then confirms that the network attack is present and generates an alert that an attack has been detected.

According to various embodiments, a network node receives a voting request from a neighboring node that indicates a potential network attack. The network node determines a set of feature values to be used as input to a classifier based on the voting request. The network node also determines whether the potential network attack is present by using the set of feature values as input to the classifier. The network node further sends a vote to the neighboring node that indicates whether the potential network attack was determined to be present.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," ... "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
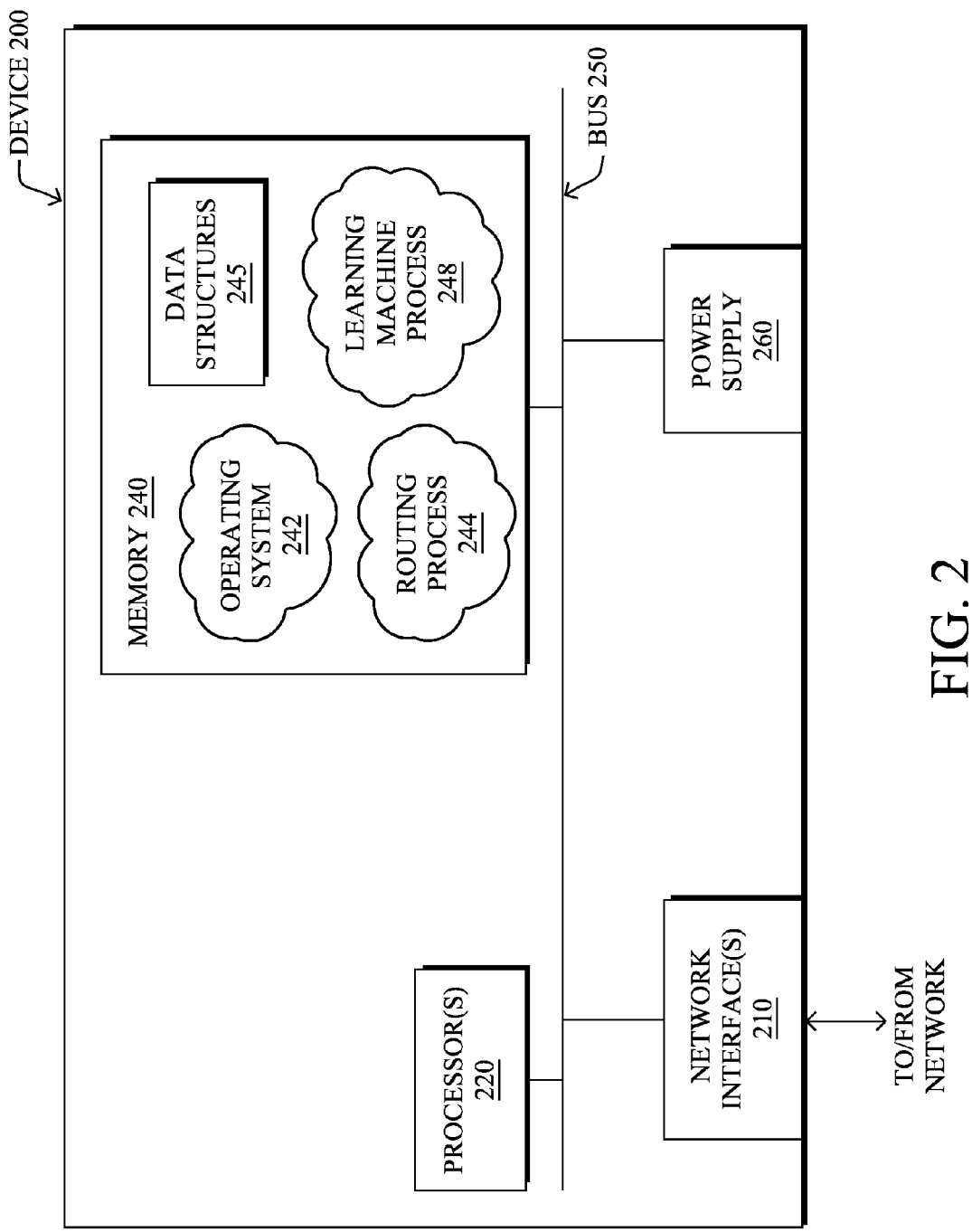
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine processes to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Learning machine process 248 contains computer executable instructions executed by the processor 220 to perform various functions, such as attack detection and reporting. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.).

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
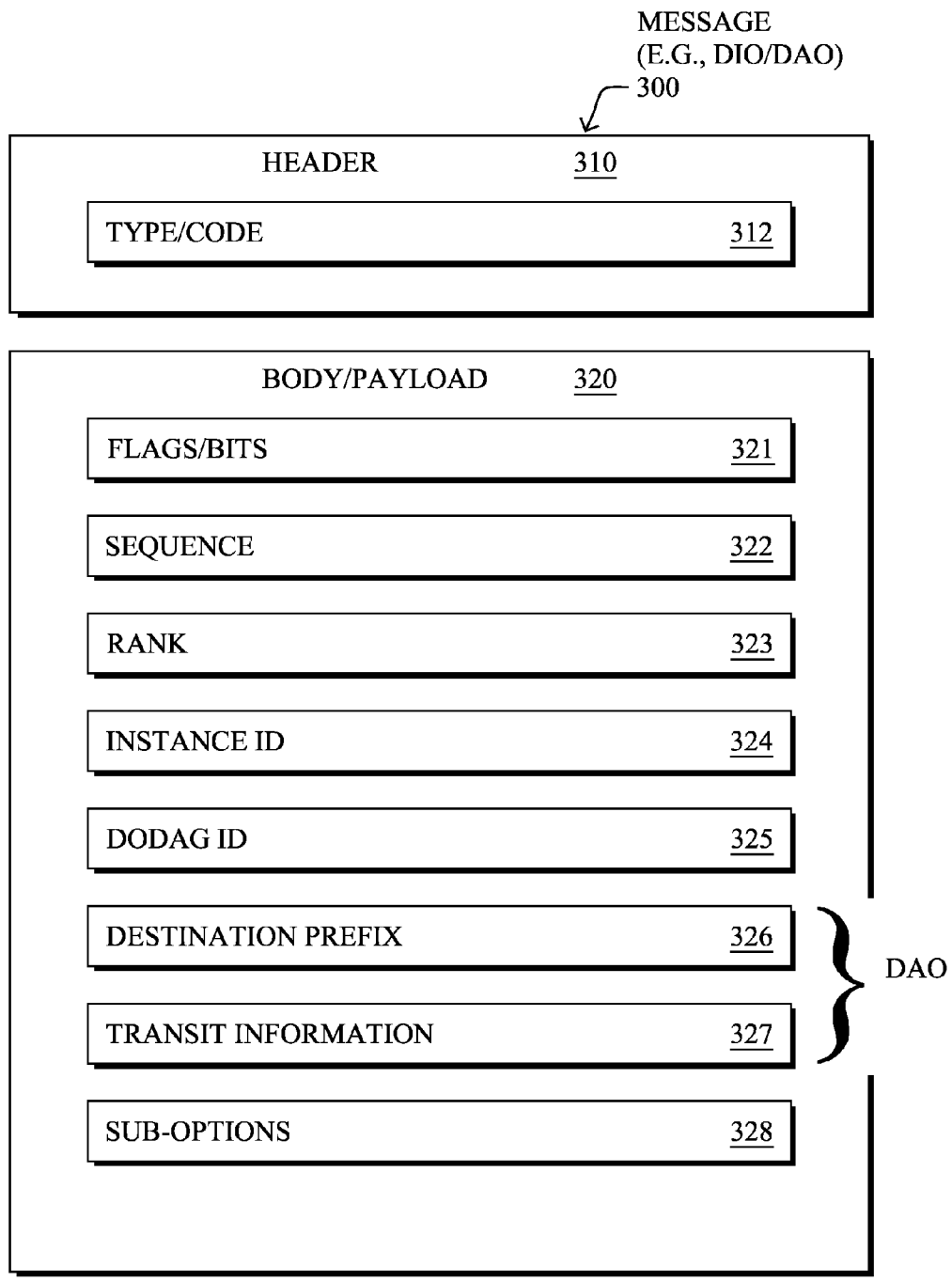
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
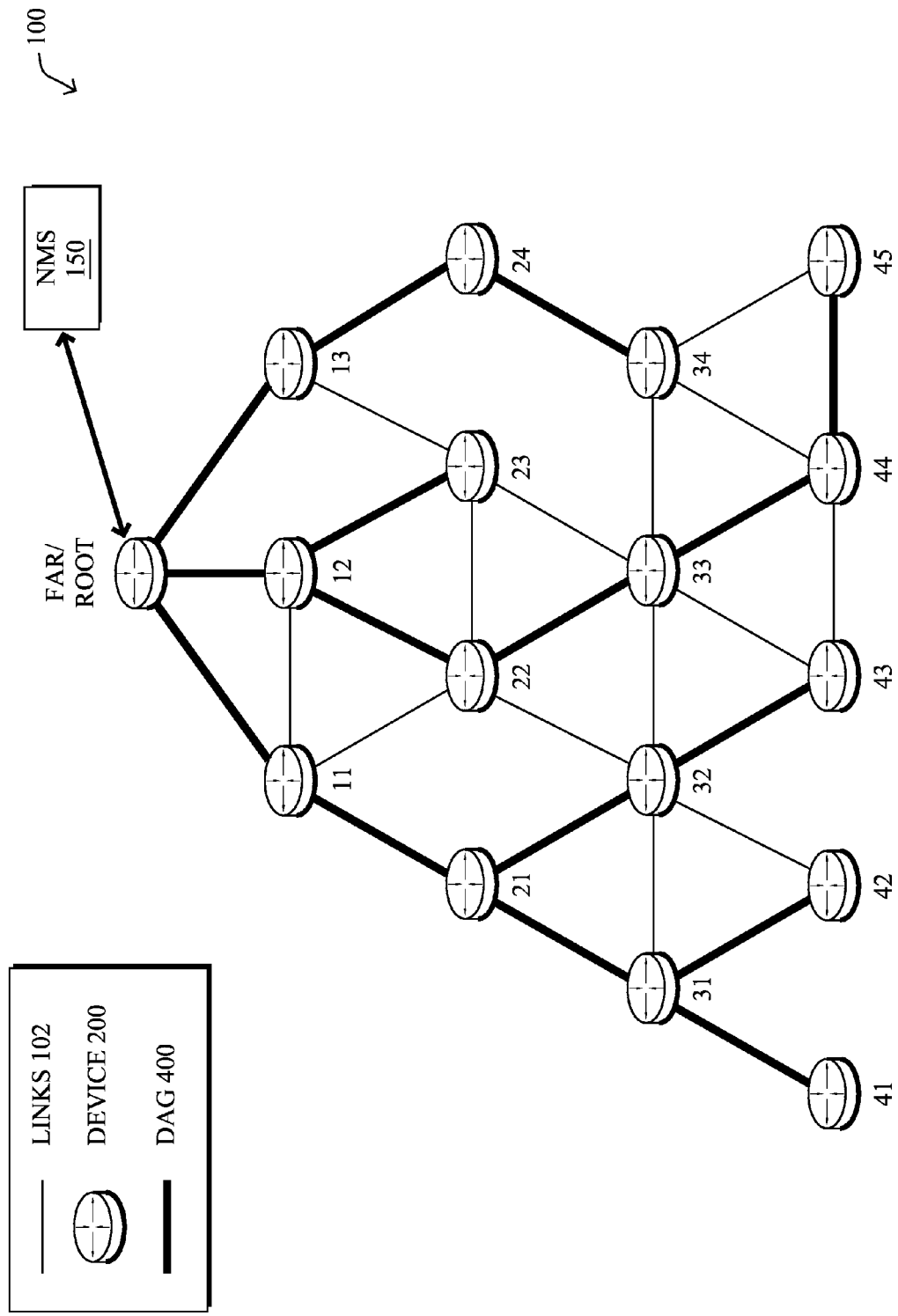
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, LLNs are typically limited in terms of available resources and tend to be more dynamic than other forms of networks, leading to a number of challenges when attempting to detect DoS and other forms of network attacks. In particular, the limited computing resources available to a given network node may prevent the node from hosting a more powerful learning machine process. In some cases, the node may simply export observation data to a learning machine hosted by a device with greater resources (e.g., a FAR). However, doing so also increases traffic overhead in the network, which may impact performance in an LLN.

According to various embodiments, lightweight learning machine classifiers may be distributed to network nodes for purposes of attack detection. In general, a classifier refers to a machine learning process that is operable to associate a label from among a set of labels with to an input set of data. For example, a classifier may apply a label (e.g., "Attack" or "No Attack") to a given set of network metrics (e.g., traffic rate, etc.). The distributed classifiers may be considered "lightweight" in that they may have lower computational requirements than a full-fledged classifier, at the tradeoff of lower performance. To improve attack detection, a central computing device (e.g., a FAR, NMS, etc.) that has greater resources may execute a more computationally intensive classifier in comparison to the distributed lightweight classifier. In cases in which a distributed classifier detects an attack, it may provide data to the central device to validate the results and/or to initiate countermeasures. However, since the performance of a distributed classifier may be relatively low, this also means that there may be a greater amount of false positives reported to the central classifier.

Figure 5A:
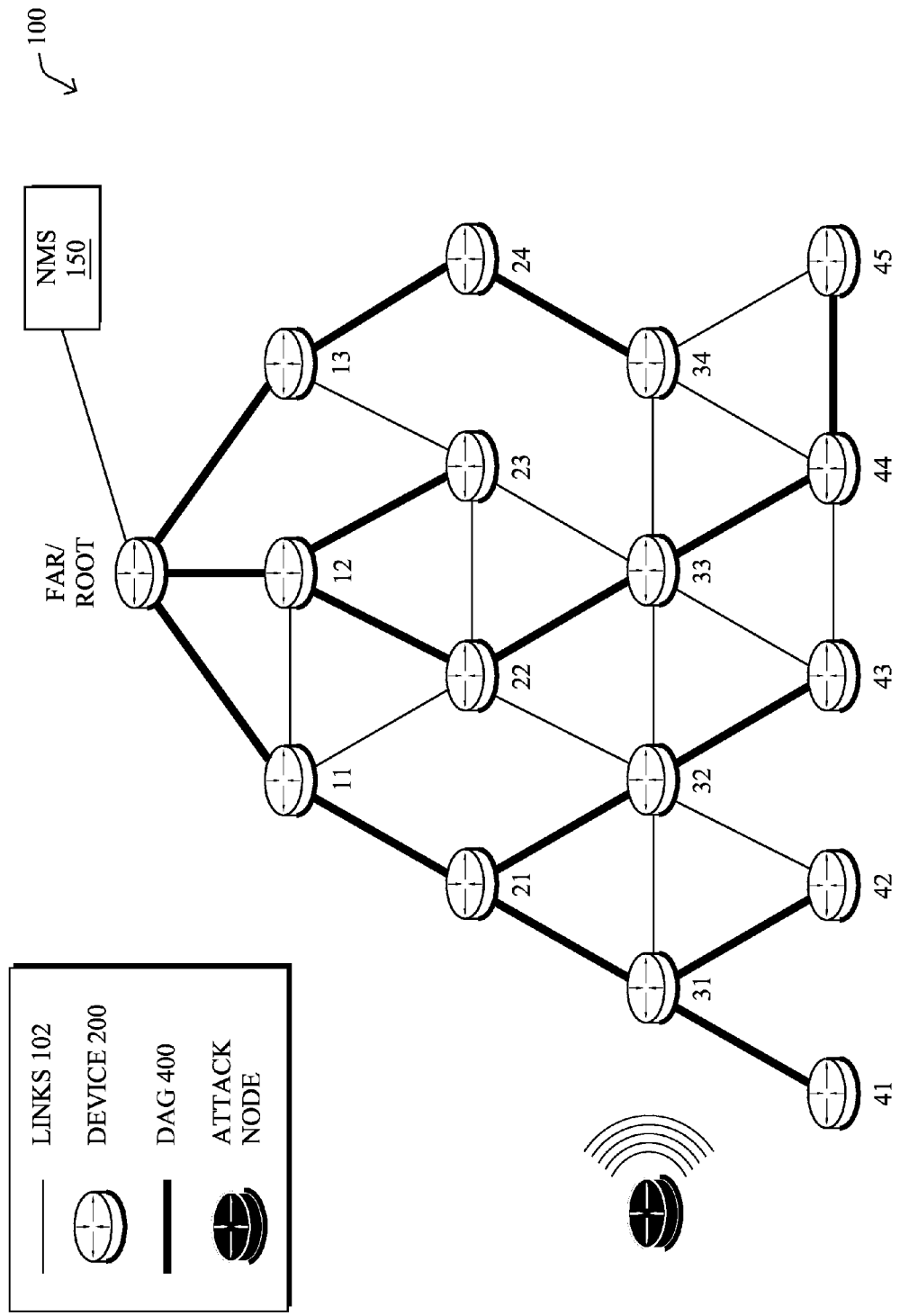
FIGS. 5A-5B illustrate an example of the detection and reporting of a potential network attack.
Figure 5B:
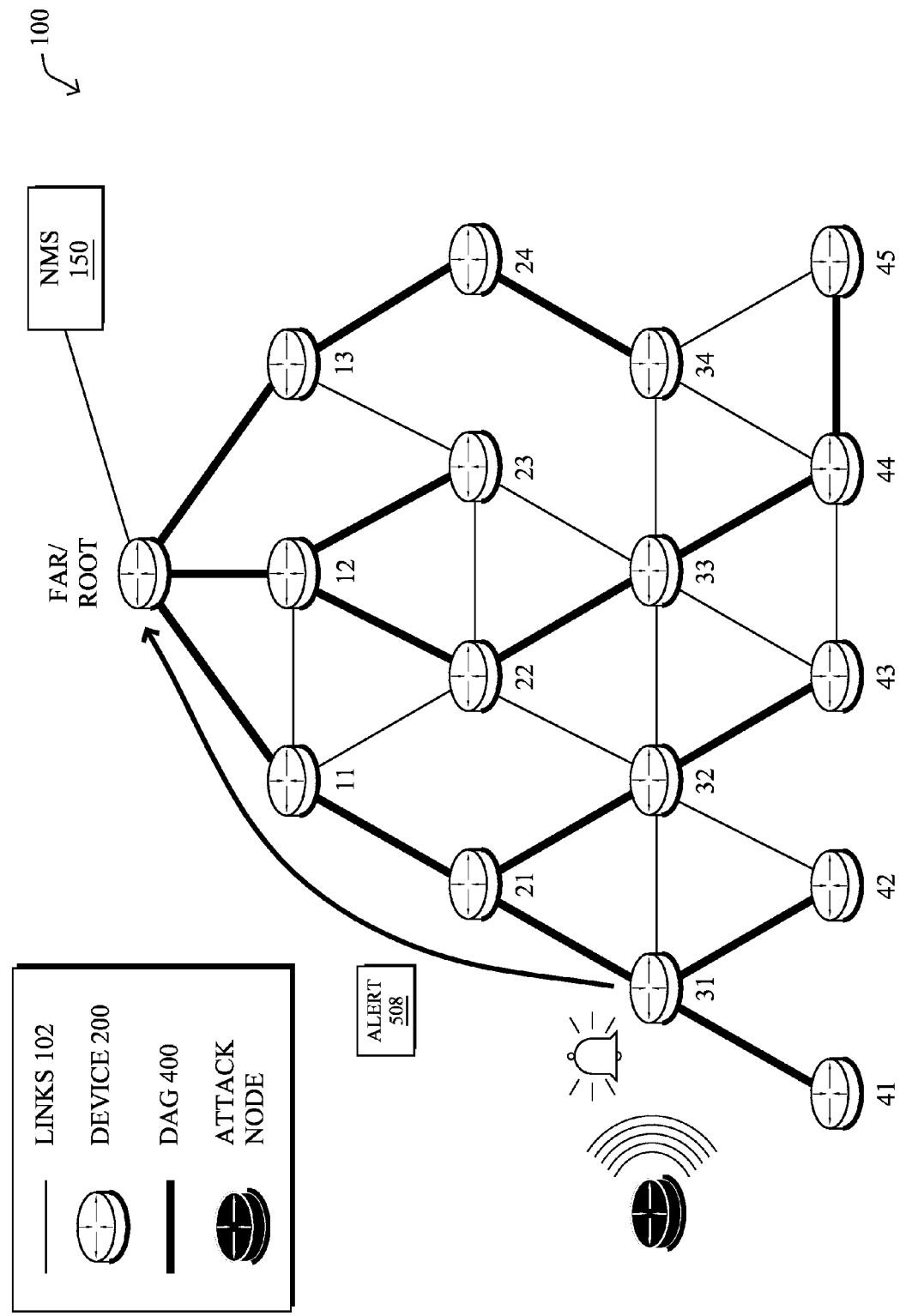

Referring now to FIGS. 5A-5B, an example is illustrated of a network attack being detected and reported within network 100. Assume for illustrative purposes that lightweight classifiers are distributed to the various nodes in network 100 and that a more power classifier is executed by the FAR. As shown in FIG. 5A, an attack node/device may launch an attack targeted at node 31. As a result of the attack, a lightweight classifier on node 31 may detect the attack based on an observed feature set of information (e.g., transmission success rates, reception success rates, etc.), as shown in FIG. 5B. In response, node 31 may generate and send an alert 508 to a supervisory device (e.g., the FAR) to verify the attack using a more powerful classifier and/or to take corrective measures. In cases in which alert 508 is a false positive, however, this means unnecessary traffic within network 100, which may already have limited bandwidth available for legitimate traffic.

Distributed Voting for Attack Detection

The techniques herein provide a voting mechanism whereby a network node that detects a network attack initiates voting among its neighboring devices before alerting a central device. This limits the number of alarms to be sent to a higher-tier classifier (e.g., hosted in the FAR), thereby reducing the use of network resources for reporting, potentially avoiding unnecessary mitigation actions, and also allowing for faster detection and mitigation to occur. In some aspects, a node whose local classifier detects an attack may send a broadcast message (potentially with a dynamically computed time to live (TTL) value) to all of the nodes in its physical range, thus triggering a voting procedure. Each of the neighbors may use its own local classifier to detect whether the triggering node is actually being attacked and sends back the result. The triggering node, based on the received results, then decides whether to send an alarm to the LLN router, or potentially to all nodes in the network.

Specifically, according to one or more embodiments of the disclosure as described in detail below, a network node receives a voting request from a neighboring node that indicates a potential network attack. The network node determines a set of feature values to be used as input to a classifier based on the voting request. The network node also determines whether the potential network attack is present by using the set of feature values as input to the classifier. The network node further sends a vote to the neighboring node that indicates whether the potential network attack was determined to be present.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, nodes in an LLN may initiate a voting process with their neighboring nodes in order to detect network attacks locally before sending an alert to a central classifier or other device. In some implementations, each network node may execute its own local classifier that continuously monitors observed network behavior (e.g., input features for the classifier), to detect network attacks.

Figure 6A:
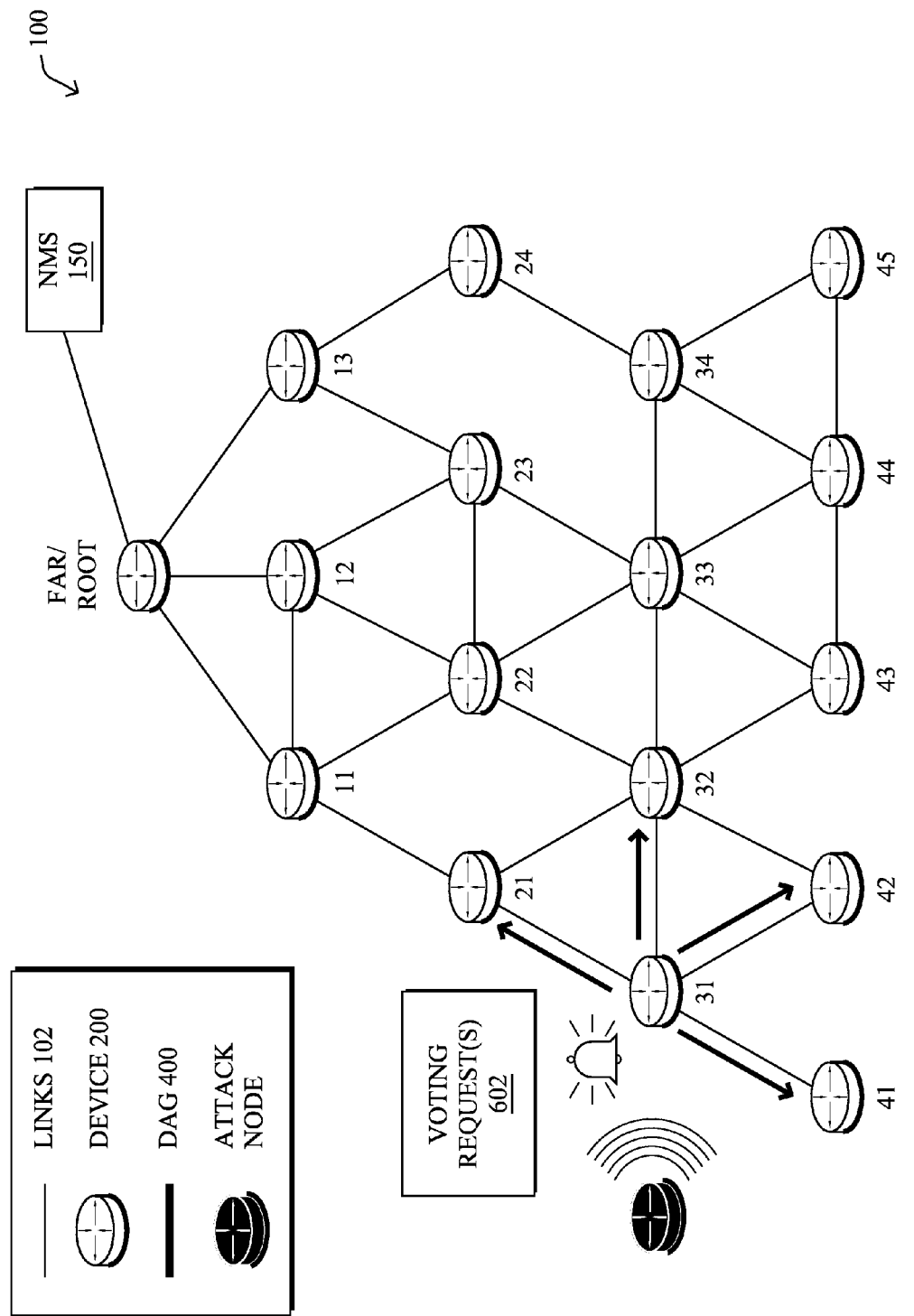
FIGS. 6A-6E illustrate an example of attack detection using distributed voting.

In various embodiments, a node that detects an attack may initiate voting among its neighboring nodes by sending voting requests to the neighboring nodes. For example, as shown in FIG. 6A, the learning machine classifier executed by node 31 may determine that a network attack is potentially underway. In response, node 31 may send voting requests 602 to the classifiers of its neighboring nodes, to validate the detected attack. In one embodiment, a voting request 602 may be a layer-2 (e.g., IEEE 802.15.4, PLC P1901.2) broadcast message that contains one or more of the following:

1) The classification result—In various cases, the behavior class returned by the classifier may be included in a voting request. For example, node 31 may include the label {"Attack"} within voting request 602. In some embodiments, the classification result may also include an associated confidence index for the classification. For example, if the classifier is a maximum likelihood classifier, the confidence metric may be a likelihood metric. This type of classifier associates each class with a statistical model. The conditional probability of an input observation (e.g., its likelihood) according to each model is then computed and the observation is attributed to the class/label with the highest probability.

2) A description of the installed classifier—In some implementations, a description of the classifier that detected an attack may be included in a voting request. For example, the voting request may indicate whether the classifier is an ANN, support vector machine (SVM), etc. The description may also include the list of input features used by the classifier. Notably, in implementations in which every node executes the same type of classifier, this field may be omitted (which may often be the case when the nodes all belong to the same WPAN).

3) The vector(s) of features that triggered classification—To validate a detected attack, a voting request may also include the input features and input feature values that were used by the initiating classifier to detect an attack. For example, the vector may include a received signal strength indication (RSSI) value, a reception (RX) success rate, or any other observations that may be used to detect the presence of a network attack.

4) A TTL value—In some embodiments, a voting request may also include an indicated time at which a voter should perform the voting/classification.

Voting request messages may be sent to, and received by, all of the nodes within the physical range of the attacked node. Note, in the case of IEEE 802.15.4 link layer with frequency hopping, the broadcast schedule is encrypted. Thus, the use of the broadcast schedule (which is only available to authenticated nodes) allows even a node which is actually under attack to communicate with its neighbors. Other strategies may request voting by sending multiple copies of a link-layer broadcast message using different frequencies, in order to increase the probability for other nodes to successfully receive the message.

As noted above, a voting request message may be sent with a limited TTL dynamically computed by the FAR, according to its knowledge of the physical topology of the network. Indeed, if the FAR determines that there are M nodes that are K hops away that are capable of detecting an attack against a node N, then the voting request message may be sent using a broadcast link layer address, but with an IP TTL=K, in order to avoid unnecessary bandwidth consumption.

In another embodiment, the intervention of the FAR can be avoided by simply having nodes never forward a received voting request based on the assumption that all of the nodes in the physical range of the target node will still receive the message with no need for other nodes to forward the request (e.g., multiple transmissions can be used for copying with losses). Notice that this mechanism limits the set of voting nodes to those in the physical range of the sender.

For the sake of illustration, the node that sends the voting request is referred to herein as the "target node" and the nodes that receive such a request are referred to herein as "neighboring nodes." For example, in the configuration of FIG. 6A, node 31 is a target node and nodes 21, 32, 41, and 42 are its neighboring nodes.

Each neighboring node receiving a voting request may perform a local detection attempt by using its own local classifier. This may be done, for example, to detect whether a multi-node attack is in progress and whether the node itself is under attack. If the local classifier also detects an attack, the node may initiate its own voting procedure by sending, in turn, voting requests to its own neighbors. In one embodiment, these messages may be sent after the expiration of a random local timer, to avoid an undesirable spike of L2 request messages.

Figure 6B:
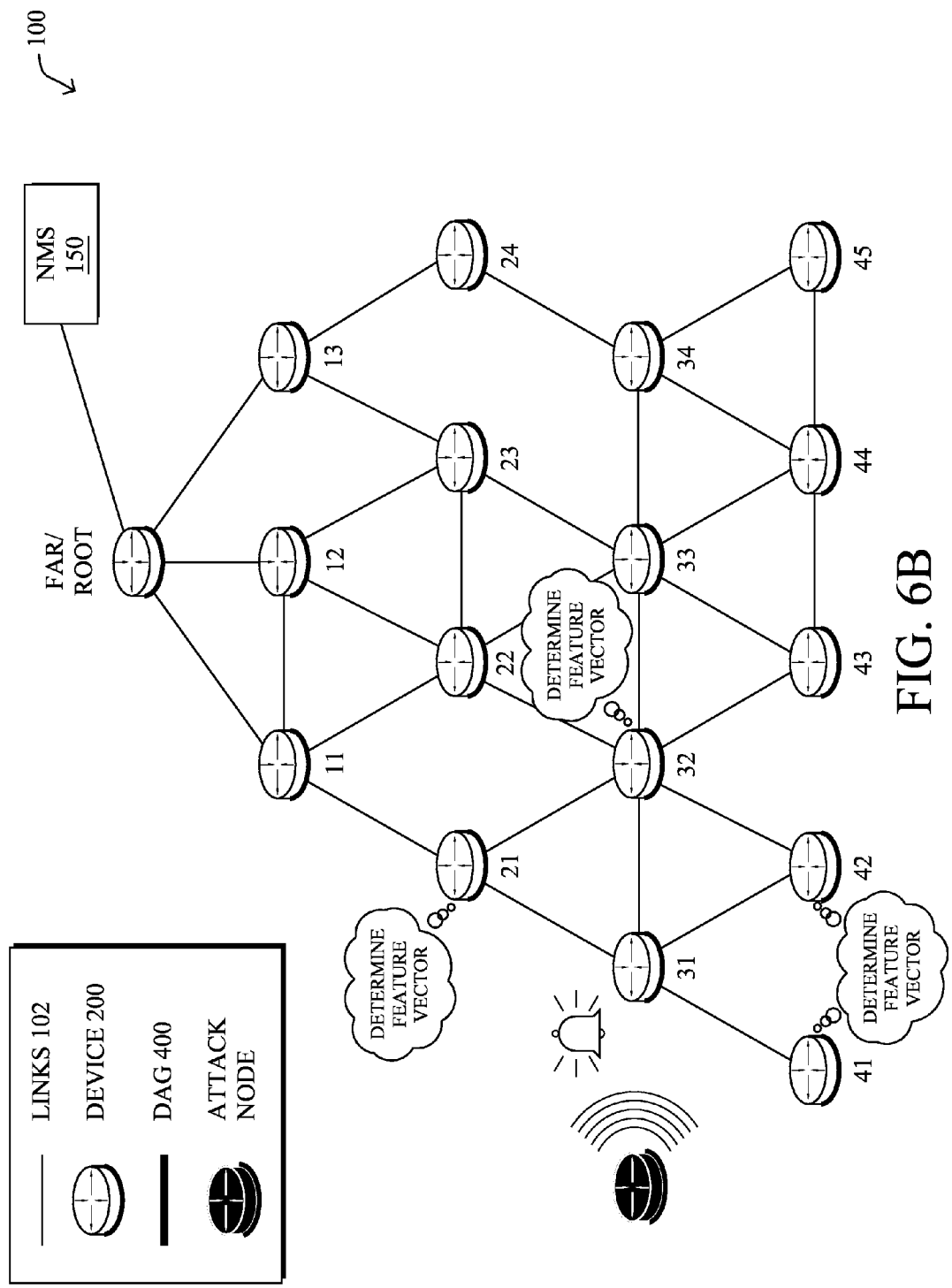
Figure 6C:
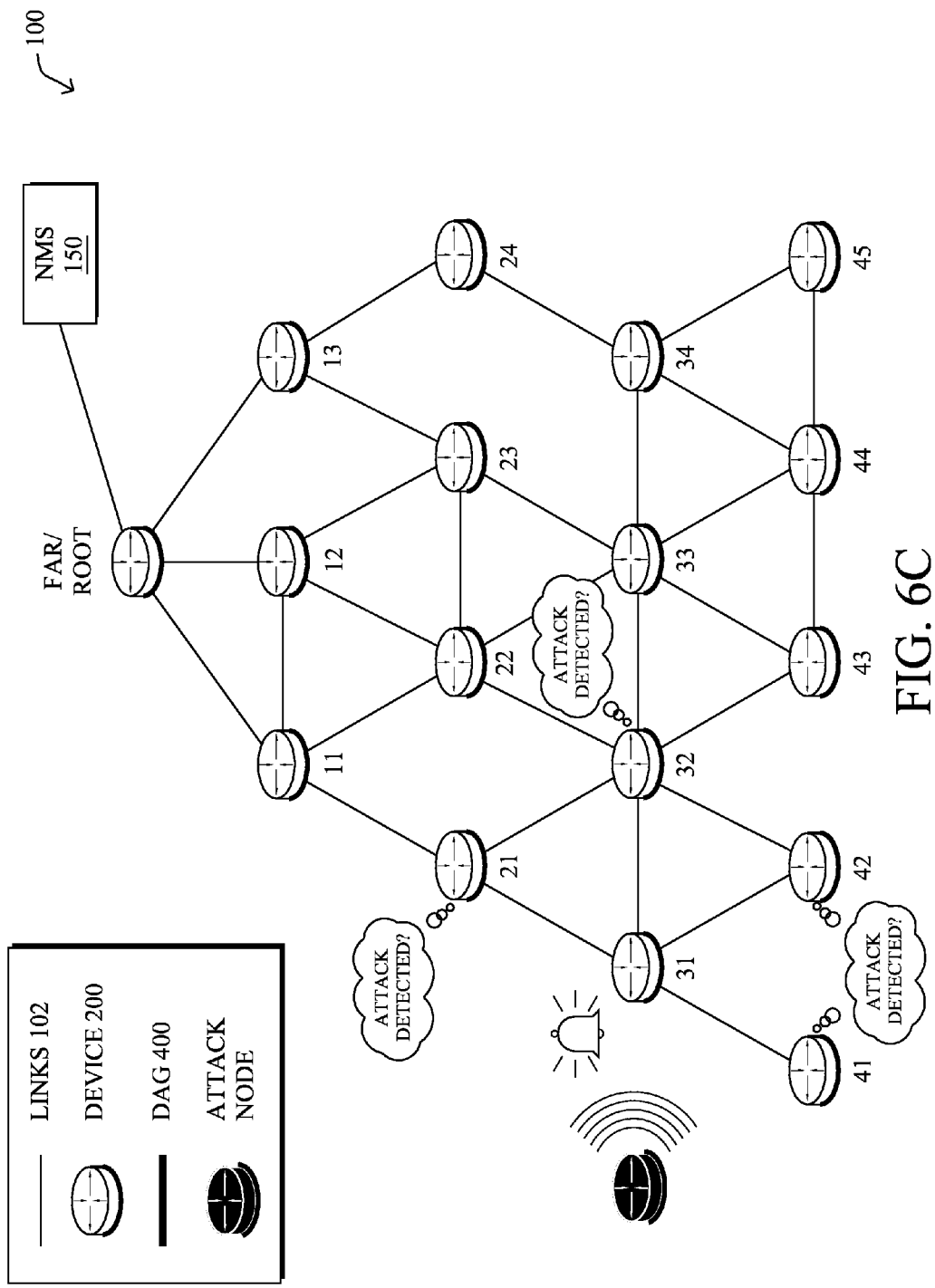

In addition to performing its own attack detection, a node that receives a voting request may also use its local classifier to vote on the conclusions reached by other devices. In particular, as shown in FIG. 6B, a neighboring node that receives as voting request may determine a feature vector for its local classifier to use for purposes of voting. At this point, two possibilities may exist. In one case, the neighboring node can evaluate the feature set for the target node based on its own perceived behavior of the target node (e.g., the voting node may use its own observations of the target node as the feature vector for purposes of voting). In other cases, however, the neighboring node may not be able to evaluate all of the features for the target node (e.g., the features specified in the voting request).

The following example illustrates a case in which a neighboring node is able to use its own observations as the feature vector during voting. Assume that the classifier of node 31 detects a jamming attack based on metrics such as an RSSI value and an RX success rate. In this case, the neighboring node (e.g., node 21) will be able to estimate the RX success probability and RSSI associated with the target node (e.g., node 31). For example, the RSSI can be estimated based on the forward RSSI statistics enclosed in acknowledgement (ACK) messages. Similarly, the RX success probability can be estimated based on the number of successful transmissions from the neighboring node to the target node (e.g., the number of successful transmissions from node 21 to node 31). In some cases, the neighboring node may also collect statistics about the successful transmissions of other nodes by observing neighborhood traffic. For example, in some cases, node 21 may collect information regarding successful transmissions between nodes 31 and 32 by listening in on the traffic between the two nodes. As used herein, "externally observable" features refer to those features regarding a target node that can be independently observed or estimated by a neighboring node.

The following example illustrates a case in which a feature may not be externally observable. In particular, assume that one of the features used by the target node to detect the attack is a transmission (TX) success probability value. For example, assume that the attack detected by node 31 was identified based in part on its TX success rate. In such a case, voting request 602 may indicate this as one of the features used to detect the attack. However, by definition, a neighboring node will not be able to estimate such a feature for the target node. In particular, the neighboring node can detect a successful transmission by the target node but it cannot detect a transmission failure (e.g., it will detect a RX failure on its side, but it will not be able to attribute it to a particular node), unless the node sees traffic sent by the target node and the corresponding acknowledgments.

According to various embodiments, a neighboring node may use different feature vectors, depending on whether the features in the voting request are externally observable. In one embodiment, the neighboring node may estimate a feature vector for the target node and use it as input for its local classifier, if all of the features in the voting request are externally observable. However, if a feature in the voting request is not externally observable, the neighboring node may instead use the value of the feature included in the voting request provided by the target node.

Values for features that are externally observable may or may not be included in a voting request. For example, a target node may always include feature values for all features used to detect an attack. In another example, if a feature is of a type that should be externally observable, the target node may include only an identifier for the feature in lieu of the value of the feature. For example, a voting request may indicate that an RSSI value was used as an input feature to detect an attack but may not include the actual RSSI value.

In some embodiments, each node may host two classifiers: a first classifier that is used to detect whether the node itself is under attack and a second classifier that is used for making a decision for the neighboring nodes (e.g., for purposes of participating in a vote). Subsequently, the first classifier may only take externally observable features as input. In this embodiment, if a neighboring node detects an anomaly, it can independently send a unicast alarm to the target neighbor (e.g., without first being solicited with a voting request). In turn, the target/neighbor may respond by broadcasting the voting request. Besides avoiding consuming bandwidth by issuing false alarms, this approach allows local information already available to the network to be leveraged. Thus, the FAR does not need to generate additional traffic in order to retrieve this information.

Figure 6D:
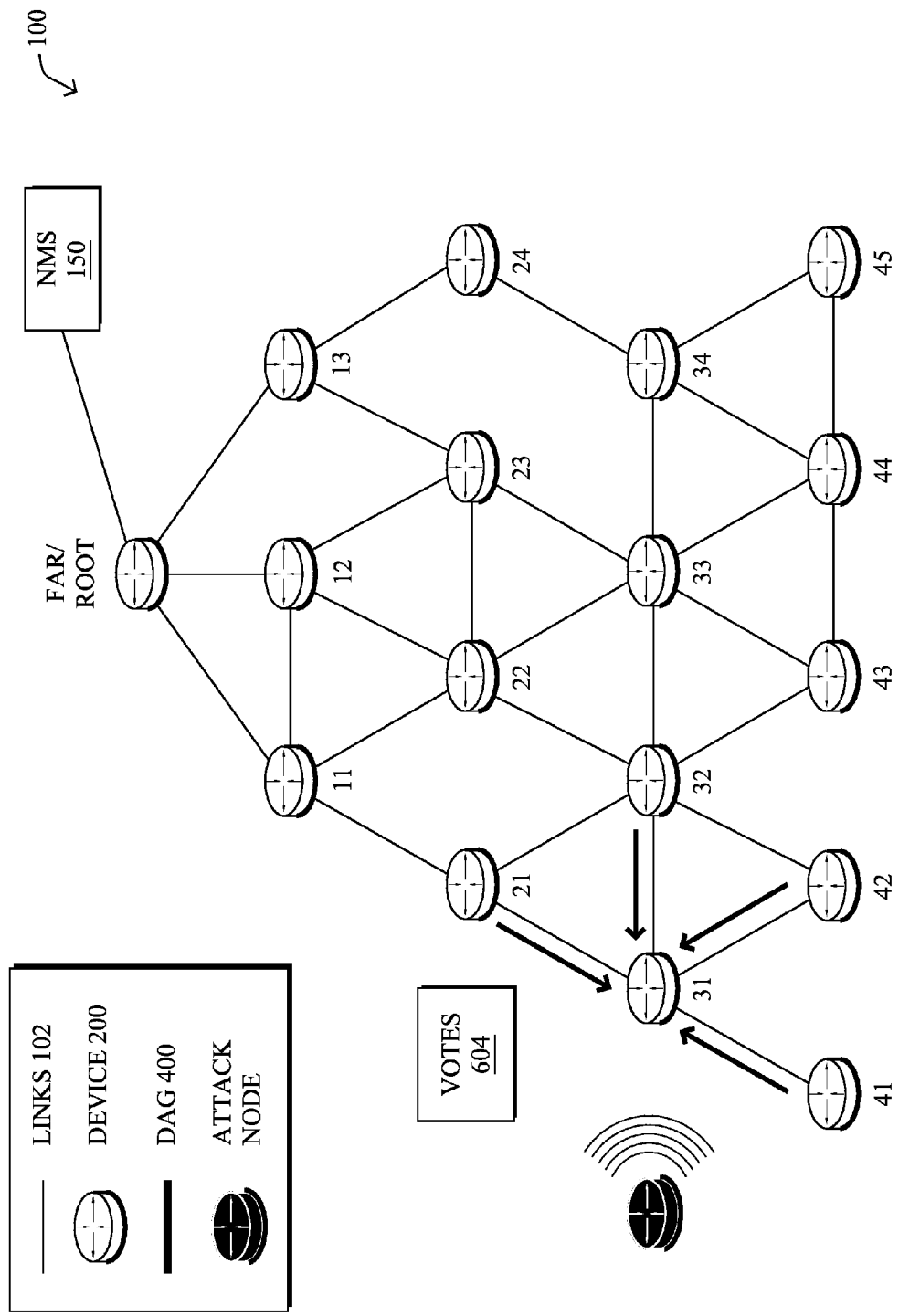

Once a neighboring node has performed its own classification regarding the target node (e.g., either using its own observations or using observations provided to it by the target node), the neighboring node may respond with a voting result message to the target node. For example, as shown in FIG. 6D, neighboring nodes 21, 32, and 41-42 may send vote messages 604 back to target node 31. In cases where an 802.15.4 radio layer is used, such a message may be sent within a broadcast slot, to avoid interference by the attacker. Other mechanisms for interference-free delivery may be used in case of different link layer technologies. For example, in the case of PLC, a tone map only available to authenticated nodes may be used to transmit the votes to avoid jamming.

In various embodiments, vote message 604 may include one or more of the following:

1) The classification result—In some cases, a neighboring node may include the results of its own classification within the vote message. For example, the neighboring node may indicate whether the feature data for the target node is labeled as "Normal" or "Attack." In one embodiment, the classification result may simply be a confirmation as to whether or not the classification by the target node has been validated (e.g., the target node detects an attack and the responding neighbor replies with a yes or a no). In some implementations, the classification results may also include a confidence index that quantifies how much confidence a neighboring node has in its classification result.
2) The classification method used—A voting neighbor may also include within a vote response information regarding how it arrived at its vote. For example, a vote response may indicate whether the neighboring node used externally observable features or used feature values that were provided by the target node. If externally observable features are used, a vector of feature values may also be included in the vote message. The vote message may further include an indication of the type of classifier that was used to generate the vote (e.g., if different types of classifiers are deployed throughout the network).
3) A Lack of Resources Indicator—In some cases, a voting node may not have sufficient resources to generate a vote. In such cases, a vote reply message may include an indication that the voter was unable to complete the voting process. In other embodiments, a neighboring node may simply ignore the voting request instead of responding with this indicator.
4) A Lack of Information Indicator—In some situations, a voting node may not have enough information to participate in a vote. For example, a neighboring node may not be able to participate in a vote if it does not have a sufficient set of externally observable feature values or the features indicated in the voting request are not compatible with its local classifier. In other embodiments, a neighboring node may simply ignore the voting request instead of responding with this indicator.

Figure 6E:
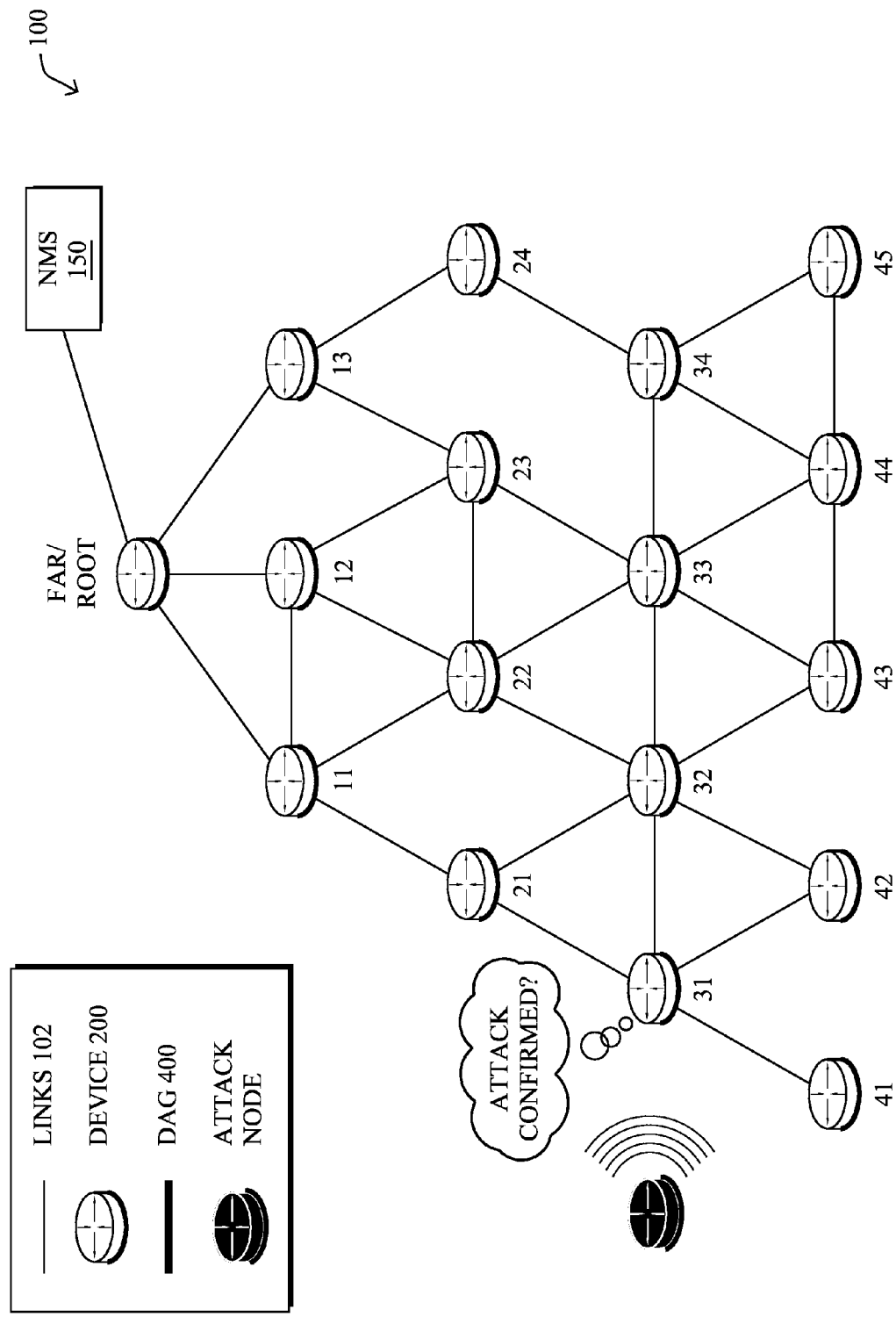

After sending voting requests to neighboring nodes, the target node may arm a timer and wait for vote messages to be received from its neighbors. When such a timer expires, the target node will make its decision about whether an attack is taking place using the votes that were received prior to expiration of the timer. For example, as shown in FIG. 6E, target node 31 may determine whether or not its neighboring nodes have confirmed the detected attack through the voting process.

Any number of different approaches may be taken by a target node to determine a voting result. In one embodiment, the target node may use a simple threshold mechanism (e.g., an attack is confirmed if at least M out of N nodes also detected the attack). In another embodiment, the target node may use the confidence indices associated with each vote, to determine the voting result. For example, if maximum likelihood classifiers are used by the voting nodes, the global attack likelihood can be estimated by the target node based on the information included in the vote messages. Such a computation can also include the result yielded by the node's local classifier. In another case, different weights can be assigned to different votes and used to determine the voting result. For example, votes from nodes that voted using their own observations (e.g., externally observable features) may be weighted differently than votes from nodes that used the values in the feature vector exported by the target node itself.

If a detected attack has been confirmed, either using externally observable features or using the exported features from the target node, the target node may then proceed with alerting a higher level device, such as the FAR. For example, node 31 may proceed with sending alert 508 to the FAR, as depicted in FIG. 5B, if the neighboring nodes of node 31 confirmed the detected attack. In such a case, alert 508 may include any or all of the information included in the vote messages received by the target node. This information may then be used by a more powerful classifier local to the FAR to further validate the detection. In another embodiment, the target node may send a broadcast message to all nodes in the network, to report that the node is under attack. Any node receiving such a message may then decide whether or not to initiate attack mitigation.

Figure 7:
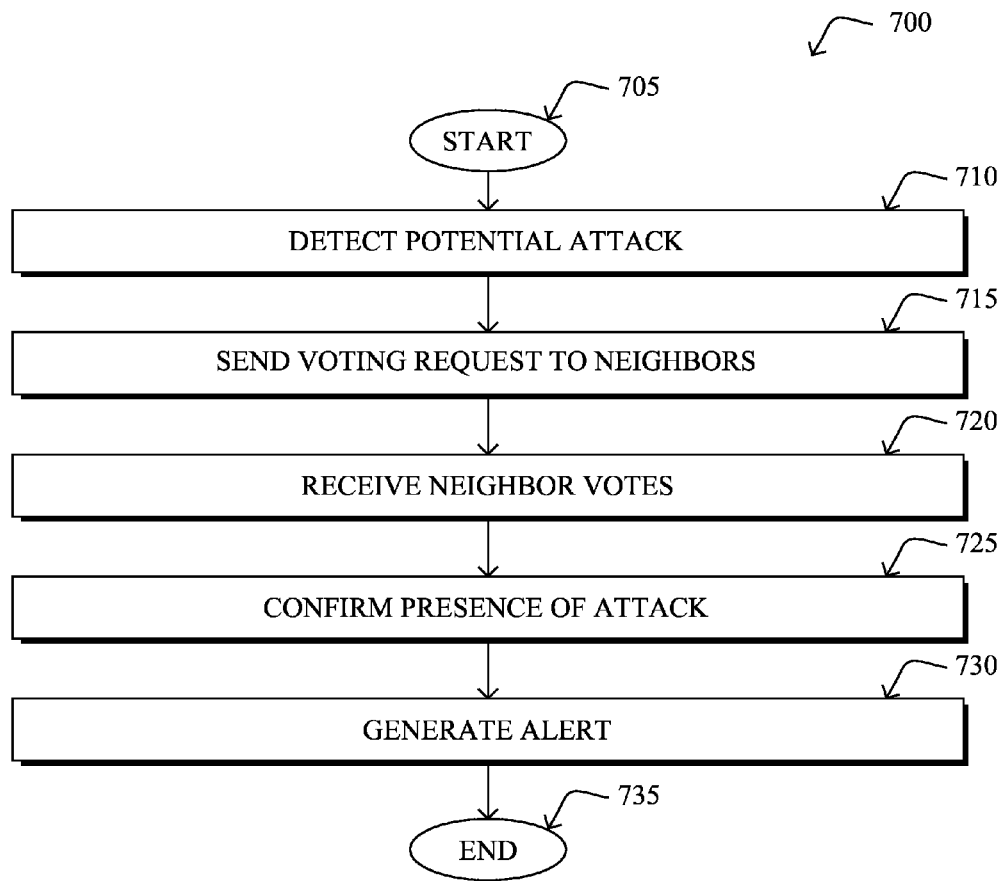
FIG. 7 illustrates an example simplified procedure for detecting an attack using distributed voting.

FIG. 7 illustrates an example simplified procedure for detecting a network attack using distributed voting, in accordance with one or more embodiments described herein. The procedure 700 may start at step 705, and continue on to step 710, where, as described in greater detail above, a network device detects a potential network attack. In one embodiment, the network device detects a potential attack by executing a machine learning classifier (e.g., an ANN, SVM, etc.). As noted above, such a classifier may generally operate by applying a label from plurality of labels to a set of input feature values. Such feature values may include, but are not limited to, RSSI data, RX success values, TX success values, bandwidth usage measurements, a measure of distinct network requests, combinations thereof, and any other measurement that may indicate the presence of a network attack.

At step 715, the network device that detects the attack may send a voting request to its neighboring nodes, as described in greater detail above. In one embodiment, for example, the network device may send the voting requests as broadcast messages to its neighboring nodes. A voting request may generally include any information needed by a neighboring node to determine whether or not the device that sent the voting request is being attacked. For example, the voting request may include any or all of the following: the set of one or more input features that were used by the requesting device in step 710 to detect the attack (e.g., RSSI, TX success, etc.), values for the input features that were used by the requesting device to detect the attack, the classification result reached by the requesting device (e.g., the label applied to the input features), the type of classifier used by the requesting device (e.g., whether the classifier is based on an ANN, etc.), or other such information.

At step 720, the requesting device receives votes from the neighboring nodes, as detailed above. In one embodiment, one or more of the votes may be generated by a particular neighboring node using the set of input feature values that were included in the voting request. In other words, a neighboring device may execute its own local classifier using the data from the requesting device, to generate a vote. In another embodiment, one or more of the votes may be generated using values for the set of input features that were observed by the neighboring node. In other words, a particular neighboring node may use its own externally observable information regarding the requesting node, to perform its own classification. The returned votes may include any information that may be used by the requesting device to tally the votes and make other judgments regarding the neighboring nodes. For example, a vote from a neighboring node may include any or all of the following: the conclusion reached by the neighboring node (e.g., an actual label generated by the local classifier, a "yes or no" confirmation, etc.), information regarding how the neighboring node reached the classification (e.g., whether externally observable data was used, whether the feature values included in the voting request were used, the type of classifier that was executed, etc.), a confidence value associated with the conclusion, or the like.

At step 725, the requesting device confirms the presence of the attack based on the received votes, as described in greater detail above. In one embodiment, the requesting device may start a local timer that ends the time period in which votes may be counted (e.g., a vote received after expiration of the timer may be disregarded). Various techniques may be used to confirm the presence of the attack. For example, the requesting device may use majority voting, unanimous voting, weighted voting (e.g., votes may be weighted based on their associated confidence values, if available), or in any other manner to determine whether or not the detected attack was confirmed by the neighboring devices.

At step 730, the requesting device generates an alert that an attack was detected, as highlighted in greater detail above. In some embodiments, the classifier executed by the device may be a lightweight classifier that uses less resource and/or has lower performance than a more powerful classifier resident on a supervisory device, such as a FAR or NMS. In such a case, the alert may be sent to the supervisory device for further validation and/or corrective measures. For example, the alert may also include any or all of the following: an indication that an attack was detected, information regarding how the conclusion was reached (e.g., which nodes participated in the vote, which input features were used by the voters, which values were used by the voters, etc.), and/or any other information that may be used by the supervisory device to confirm the presence of the attack. In another embodiment, the alert may be broadcast throughout the network. For example, one or more of the neighboring devices may institute corrective measures in response to receiving the alert. Procedure 700 then ends at step 735.

Figure 8:
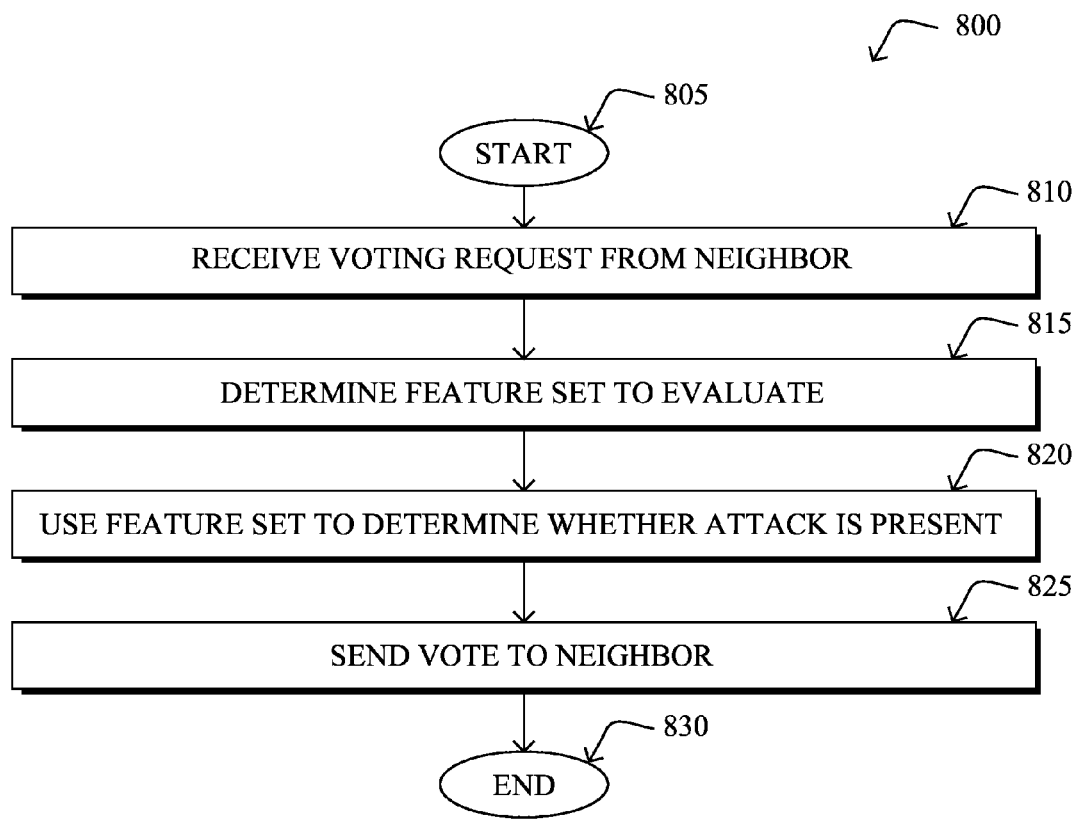
FIG. 8 illustrates an example simplified procedure for participating in a distributed vote for attack detection.

FIG. 8 illustrates an example simplified procedure for participating in a distributed vote for attack detection, in accordance with one or more embodiments described herein. The procedure 800 may start at step 805, and continues to step 810, where, as described in greater detail above, a voting request is received from a neighbor device. As noted above, the voting request may be sent in response to the neighbor device detecting the presence of a network attack (e.g., a DoS attack). In general, as also noted above, the voting request may include any information needed by the receiving device to make its own determination as to whether or not an attack against the sending device is present (e.g., the input features used to detect the attack, values for the input features, etc.).

At step 815, a feature set to evaluate is determined, as detailed above. In one embodiment, the receiving device may analyze the features included in the voting request and/or a label included in the voting request, to determine whether or not the receiving device can use its own observation data to reach an independent conclusion (e.g., whether or not externally observable data may be used). In another embodiment, some or all of the determined feature set may comprise feature values that were included in the received voting request.

At step 820, the feature set is used to determine whether an attack is actually present, as highlighted above. Once the receiving device has determined which feature values to analyze (e.g., its own observations or the observations of the requesting device), the receiving device uses these values as input to its own local classifier, to generate a vote. For example, if the requesting device based the detection on factors that cannot be observed by the receiving device, the receiving device may use the values from the voting request as input to its own local classifier, to generate a vote. In another example, if the receiving device has sufficient observations of its own to make the determination, this observation data may be used as input to its local classifier.

At step 825, a vote is generated and sent to the neighboring device that sent the voting request, as described in greater detail above. Such a vote may include information regarding the conclusion reached by the voter (e.g., confirming or denying the presence of the attack), information regarding how the conclusion was reached (e.g., using its own observations or that of the requesting device, details on its local classifier, etc.), or a confidence value associated with the conclusion. Such a vote may then be used by the requesting node to determine whether or not the detected attack is actually present or is a false positive. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide performance improvements for attack detection obtained with a single classifier by combining the outputs of classifiers hosted by neighboring nodes using a voting process. The final result of the voting process may result in fewer false positives, thereby avoiding the generation of unnecessary traffic due to false alarms (e.g., to alert the FAR). In addition, the techniques herein allow a neighboring node to leverage locally available data that a FAR would otherwise need to pull explicitly (e.g., to verify the attack), thus further reducing bandwidth utilization in the network.

While there have been shown and described illustrative embodiments that provide for validating the detection of a network attack, it is to be understood that various other adaptations and modifications may be made within the spirit and scope of the embodiments herein. For example, while the techniques herein are described primarily with respect to attack-detection classifiers, the techniques herein may also be used to vote on different classification labels that are not related to attack detection (e.g., labels that relate to other network conditions). In addition, while the techniques herein are described primarily in the context of an LLN, the techniques herein may be applied more generally to any form of computer network, such as an enterprise network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    detecting, at a first network device, a potential network attack by executing a classifier, wherein the classifier is configured to select a label from among a plurality of labels based on a set of input features;
    sending voting requests that identify the potential network attack to a plurality of neighboring network devices, wherein the voting requests include a set of values for the set of input features that were used to detect the potential attack at the first network device, and wherein a particular neighboring network device determines input features for a local classifier and uses the local classifier to generate a vote regarding the potential network attack;
    receiving, from each of the one or more of the neighboring network devices, a vote regarding the potential network attack;
    confirming, by the first network device, that the network attack is present based on the received votes; and
    generating, by the first network device, an alert that an attack has been detected.

2. The method as in claim 1, wherein a particular vote is generated by a particular neighboring network device using values for the set of input features that were observed by the neighboring network node.

3. The method as in claim 1, wherein a particular vote is generated by a particular neighboring network device using the set of values for the input features included in the voting requests.

4. The method as in claim 1, wherein the network attack is confirmed after expiration of a timer.

5. A method, comprising:
    receiving, at a network node, a voting request from a neighboring node that indicates a potential network attack;
    determining a set of feature values to be used as input to a local classifier based on the voting request, wherein the voting request includes the set of one or more feature values;
    determining, by the network node, whether the potential network attack is present by using the determined set of feature values as input to the local classifier; and
    sending, by the network node, a vote to the neighboring node that indicates whether the potential network attack was determined to be present.

6. The method as in claim 5, further comprising:
    determining that the classifier matches a type of classifier indicated by the voting request.

7. The method as in claim 5, further comprising:
    generating a particular feature value by observing a communication link to the neighboring node.

8. The method as in claim 5, wherein the vote indicates whether the vote was based on feature values observed by the network node or was based on feature values included in the voting request.

9. An apparatus, comprising:
    one or more network interfaces to communicate with a low power and lossy network (LLN);
    a processor coupled to the network interfaces and adapted to execute one or more processes; and
    a memory configured to store a process executable by the processor, the process when executed operable to:
        detect a potential network attack by executing a classifier, wherein the classifier is configured to select a label from among a plurality of labels based on a set of input features;
        send voting requests that identify the potential network attack to a plurality of neighboring network devices, wherein the voting requests include a set of values for the set of input features that were used to detect the potential attack at the first network device, and wherein a particular neighboring network device determines input features for a local classifier and uses the local classifier to generate a vote regarding the potential network attack;
        receive, from each of the one or more of the neighboring network devices, a vote regarding the potential network attack;
        confirm that the network attack is present based on the received votes; and
        generate an alert that an attack has been detected.

10. The apparatus as in claim 9, wherein a particular vote is generated by a particular neighboring network device using values for the set of input features that were observed by the neighboring network node.

11. The apparatus as in claim 9, wherein a particular vote is generated by a particular neighboring network device using the set of values for the input features included in the voting requests.

12. The apparatus as in claim 9, wherein the network attack is confirmed after expiration of a timer.

13. An apparatus, comprising:
    one or more network interfaces to communicate with a low power and lossy network (LLN);
    a processor coupled to the network interfaces and adapted to execute one or more processes; and
    a memory configured to store a process executable by the processor, the process when executed operable to:
        receive a voting request from a neighboring node that indicates a potential network attack;
        determine a set of feature values to be used as input to a local classifier based on the voting request, wherein the voting request includes the set of one or more feature values;
        determine whether the potential network attack is present by using the determined set of feature values as input to the local classifier; and
        send a vote to the neighboring node that indicates whether the potential network attack was determined to be present.

14. The apparatus as in claim 13, wherein the process when executed is further operable to:
    determine that the classifier matches a type of classifier indicated by the voting request.

15. The apparatus as in claim 13, wherein the process when executed is further operable to:
    generate a particular feature value by observing a communication link to the neighboring node.

16. The apparatus as in claim 13, wherein the vote indicates whether the vote was based on feature values observed by the network node or was based on feature values included in the voting request.

17. A tangible, non-transitory, computer-readable media having software encoded thereon, the software when executed by a processor operable to:
    receive a voting request from a neighboring node that indicates a potential network attack;
    determine a set of feature values to be used as input to a local classifier based on the voting request, wherein the voting request includes the set of one or more feature values;
    determine whether the potential network attack is present by using the determined set of feature values as input to the local classifier; and send a vote to the neighboring node that indicates whether the potential network attack was determined to be present.

18. The tangible, non-transitory, computer-readable media as in claim 17, wherein the software when executed by the processor is further operable to:
   determine that the classifier matches a type of classifier indicated by the voting request.

19. The tangible, non-transitory, computer-readable media as in claim 17, wherein the vote indicates whether the vote was based on feature values observed by the network node or was based on feature values included in the voting request.

20. A tangible, non-transitory, computer-readable media having software encoded thereon, the software when executed by a processor operable to:
   detect a potential network attack by executing a classifier, wherein the classifier is configured to select a label from among a plurality of labels based on a set of input features;
   send voting requests that identify the potential network attack to a plurality of neighboring network devices, wherein the voting requests include a set of values for the set of input features that were used to detect the potential attack at the first network device, and wherein a particular neighboring network device determines input features for a local classifier and uses the local classifier to generate a vote regarding the potential network attack;
   receive, from each of the one or more of the neighboring network devices, a vote regarding the potential network attack;
   confirm that the network attack is present based on the received votes; and
   generate an alert that an attack has been detected.

21. The tangible, non-transitory, computer-readable media as in claim 20, wherein a particular vote is generated by a particular neighboring network device using values for the set of input features that were observed by the neighboring network node.

22. The tangible, non-transitory, computer-readable media as in claim 20, wherein a particular vote is generated by a particular neighboring network device using the set of values for the input features included in the voting requests.

* * * * *